May 18, 1954  M. CLARK, JR  2,678,835
ROTATING JOINT
Filed Feb. 8, 1946

INVENTOR
MELVILLE CLARK, JR.

BY  ATTORNEY

Patented May 18, 1954

2,678,835

UNITED STATES PATENT OFFICE 2,678,835

ROTATING JOINT

Melville Clark, Jr., Syracuse, N. Y., assignor, by mesne assignments, to the United States of America as represented by the Secretary of the Navy Application February 8, 1946, Serial No. 646,445

6 Claims. (Cl. 285—97.5)

This invention relates to movable joints for hollow tubes and more particularly to sealed joints for cylindrical tubes permitting relative axial rotation of same.

For some applications, notably coaxial lines and cylindrical wave guides used in radio or radar apparatus, the use of conventional packing gland joints to produce a seal between two rotating elements of a system is not entirely satisfactory. The main objections to packing gland seals heretofore developed are the high torque and power required for their operation with consequent development of heat, their unadaptability to high speed operation, and the inability of such joints to continually maintain a reliable seal during the normal life of the equipment with which they are used. Another objection to packing gland joints is the necessity of lubrication, which must be provided by means of an impregnated packing material or by means of suitable fittings permitting the application of the lubricant at intervals.

The general object of this invention is to provide a rotating joint which will overcome the above difficulties.

Another object of this invention is to provide a rotating joint having a novel seal which will be unaffected by wear.

A further object of this invention is to provide a novel seal for a rotatable joint operatively connecting a pair of cylindrical tubes which are rotatably mounted with respect to each other for maintaining a predetermined pressure within said tubes upon relative rotation thereof, and for equalizing internal and external pressures of said tubes upon cessation of relative rotation of the tubes.

A still further object of this invention is to provide a rotating joint capable of high speed operation with low applied torque.

These and other objects will be apparent from the following specification when taken with the accompanying drawings, in which.

Figure 1:
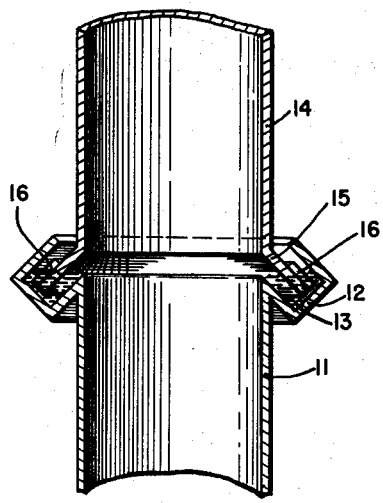
Fig. 1 is a sectional view of one embodiment of the invention.
Figure 2:
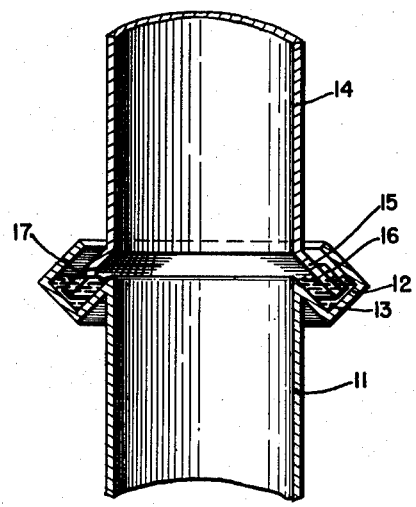
Fig. 2 is a sectional view of another embodiment of the invention illustrating the manner in which automatic pressure equalization is accomplished.
Figure 3:
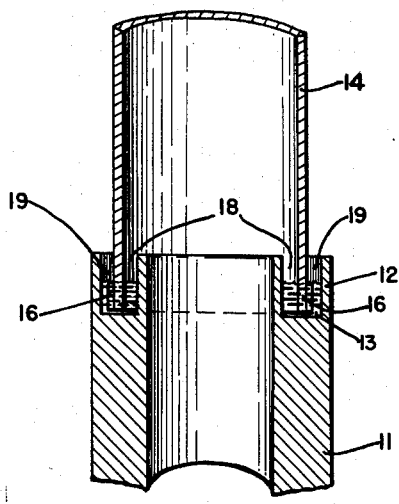
Fig. 3 is a sectional view of still another embodiment of the invention using principally gravitational fields rather than rotational acceleration forces to accommodate large pressure differentials.

Referring to Figs. 1, 2, and 3, member 11 is a fixed approximately vertical tube when joint is not rotating on whose upper edge is formed or affixed an annular recess 12 for containing the dense liquid seal 13. This dense liquid seal may be a conductor such as mercury (Hg), if electrical conductivity between the tubes is desired, or it may be a dense insulating liquid where electrical conductivity is not desired. Member 14 is a tube rotatably mounted about the same axis as tube 11 and having a skirt 15 flared or affixed to its lower edge. Skirt 15 has attached to it at intervals ribs 16 for causing the seal liquid 13 to rotate within recess 12. As shown in Fig. 2 an air duct 17 is included for applications where automatic pressure equalization is desired.

Under static conditions, the tubes 11 and 14 are on an approximately vertical axis and the surface of the sealing liquid 13 has its surface in a horizontal plane. In this condition, the duct 17 is uncovered and air may pass through it thereby equalizing any pressure differential existing between the interior and exterior of the wave guide.

In the embodiment shown in Figs. 1 and 2, when tube 14 is rotated, it causes the sealing liquid 13 to rotate also, through the driving action of the ribs 16. Centrifugal force resulting from the rotation of the liquid seal 13 causes it to flow outwardly so that its surface assumes a parabolical shape, the shape of which is dependent on the rotational speed and the density of the liquid 13. The outward flow of the liquid 13 closes the duct 17 so that the pressure existing at the time rotation is commenced will be maintained within the tubes 11 and 14 regardless of pressure differences encountered external to the apparatus. Under operating conditions, it is no longer necessary to maintain the tubes 11 and 14 on an approximately vertical axis, but they may be oriented in any desired manner since the centrifugal force will hold the seal liquid 13 in position. In installations where it is desired to maintain a pressure differential under static conditions, the duct 17 is not included, and the recess 12 is made deep so that the inner column 18 and outer column 19 are longer in order that the seal liquid 13 may rise in the inner or outer column to balance a negative or positive pressure differential.

For the embodiment shown in Fig. 3, it is not necessary for the liquid to rotate since the gravitational force on the dense liquid will tend to pull the liquid downward.

The rotation of tube 14 may be accomplished in any acceptable manner, the choice of which will depend to a large extent on the characteristics of the associated apparatus with which this invention is used.

If a rotating joint is desired for a cylindrical waveguide or coaxial line, then either the customary type of electrical choke joint may be used within the mechanical seal desired above or preferably the mechanical seal itself may be used as the choke joint for the microwave energy. The latter method has the obvious advantage of simplicity in that the electrical joint and seal are combined as a single unit. In this latter method the distance from the exposed surface of the conducting liquid 13 at the inside of the joint to the inside wall of the wave guide under operating conditions of rotation should be effectively one-half wavelength or integral multiple thereof long, it being understood of course that the wavelength refers to the wavelength in the guide.

While three embodiments of my invention have been disclosed and described, it is to be understood that various modifications and changes may be made therein without departing from the spirit and scope thereof as set forth in the appended claims.

What is claimed is:

1. A novel seal for a rotatable joint operatively connecting a pair of cylindrical tubes which are rotatably mounted with respect to each other comprising a fixed cylindrical tube, an annular recess affixed to said tube, a liquid seal disposed within said recess, a second tube rotatably mounted and axially positioned with respect to said first-mentioned cylindrical tube, a flared skirt affixed to the lower edge of said second-mentioned tube extending into said recess, a plurality of ribs disposed upon the circumference of said skirt for causing rotation of said liquid in response to relative rotation of said tubes, and a duct in said skirt for equalizing internal and external pressures on said tubes upon cessation of relative rotation of said tubes.

2. A seal for a rotatable joint operatively connecting a pair of cylindrical tubes which are rotatably mounted with respect to each other comprising a fixed cylindrical tube, an annular recess affixed to said tube, a liquid seal disposed within said recess, a second tube rotatably mounted and axially positioned with respect to said first-mentioned cylindrical tube, a flared skirt affixed to the lower edge of said first-mentioned tube extending into said recess, a plurality of ribs disposed upon the circumference of said skirt for causing rotation of said liquid in response to relative rotation of said tubes, and a duct in said skirt for equalizing internal and external pressures on said tubes upon cessation of relative rotation of said tubes, said duct being positioned above the level of said liquid at rest and having at least one end below the level of said liquid during relative rotation of said tubes.

3. A seal for connecting coaxial tubes which are rotatably mounted with respect to each other comprising a lower fixed tube having an annular recess formed at the upper extremity thereof, said recess extending in a direction making an acute angle with the axis of said tube whereby said recess is adapted to retain a liquid about its periphery while the liquid is at rest and while it is in rotation, a liquid seal disposed in said recess, an upper tube rotatably mounted with respect to said lower tube, a flared skirt affixed to the lower edge of said upper tube extending into said recess, said skirt having an opening formed therethrough at a point above the level of said liquid seal while at rest, at least one end of said opening being below the level of said liquid seal during rotation of said seal and means for causing rotation of said liquid seal in response to relative rotation of said tubes.

4. A novel seal as in claim 1 wherein said pair of tubes constitute a wave guide for the propagation of electromagnetic energy and wherein said liquid is electrically conductive, the distance from the surface of said liquid seal to the inside wall of said cylindrical tubes being effectively an integral multiple of one-half a wave length at the frequency of the energy propagated in said wave guide.

5. A seal for connecting coaxial tubes which are rotatably mounted with respect to each other comprising a first tube having an annular recess formed at one extremity thereof, said recess extending in a direction making an acute angle with the axis of said tube whereby said recess is adapted to retain a liquid about its periphery when said liquid is in motion and while said liquid is at rest with said first tube in an upright position, a liquid seal disposed in said recess, a second tube rotatably mounted with respect to said first tube, a flared skirt affixed to one end of said second tube and extending into said recess, said skirt having an opening formed therethrough at a point above the level of said liquid seal while said liquid is at rest with said first tube in an upright position, at least one end of said opening being below the level of said liquid seal during rotation of said seal and means for causing rotation of said liquid seal in response to relative rotation of said tubes.

6. A rotatable joint for use in wave guide transmission lines comprising, in combination, first and second cylindrical tube sections, said sections being in axial alignment whereby electromagnetic energy may be propagated therethrough, an annular U-shaped channel member having one of its side walls joined at an acute angle to one end of said first section, a flared skirt extension terminating said second section and extending into said channel member, an electrically conductive fluid disposed within said channel for sealing said sections against radiation leakage during relative rotation of said sections, said fluid having a level such that the distance from its exposed surface to the inner wall of said first wave guide section is an odd multiple integral of one-half the wave length of the frequency of operation of said wave guide sections.

References Cited in the file of this patent
UNITED STATES PATENTS

| Number | Name | Date |
| --- | --- | --- |
| 2,008 | Cornelius | Mar. 18, 1841 |
| 957,314 | Dow | May 10, 1910 |
| 1,172,836 | Roser | Feb. 22, 1916 |
| 1,699,770 | Voss et al. | Jan. 22, 1929 |
| 1,879,625 | Mendenhall et al. | Sept. 27, 1932 |
| 2,081,550 | Mendenhall et al. | May 25, 1937 |